Sept. 29, 1931.   W. SYKES   1,825,372
REGENERATIVE FURNACE CONTROLLING APPARATUS
Filed Jan. 22, 1930   10 Sheets-Sheet 1

Sept. 29, 1931. W. SYKES 1,825,372
REGENERATIVE FURNACE CONTROLLING APPARATUS
Filed Jan. 22, 1930 10 Sheets-Sheet 2

Inventor.
Wilfred Sykes.
By Dyrenforth, Lee, Chritton and Wiles
Attys.

Sept. 29, 1931.  W. SYKES  1,825,372
REGENERATIVE FURNACE CONTROLLING APPARATUS
Filed Jan. 22, 1930   10 Sheets-Sheet 4

Inventor.
Wilfred Sykes.
By Dyrenforth, Lee, Chritten and Wiles
Attys.

Sept. 29, 1931. W. SYKES 1,825,372
REGENERATIVE FURNACE CONTROLLING APPARATUS
Filed Jan. 22, 1930 10 Sheets-Sheet 5
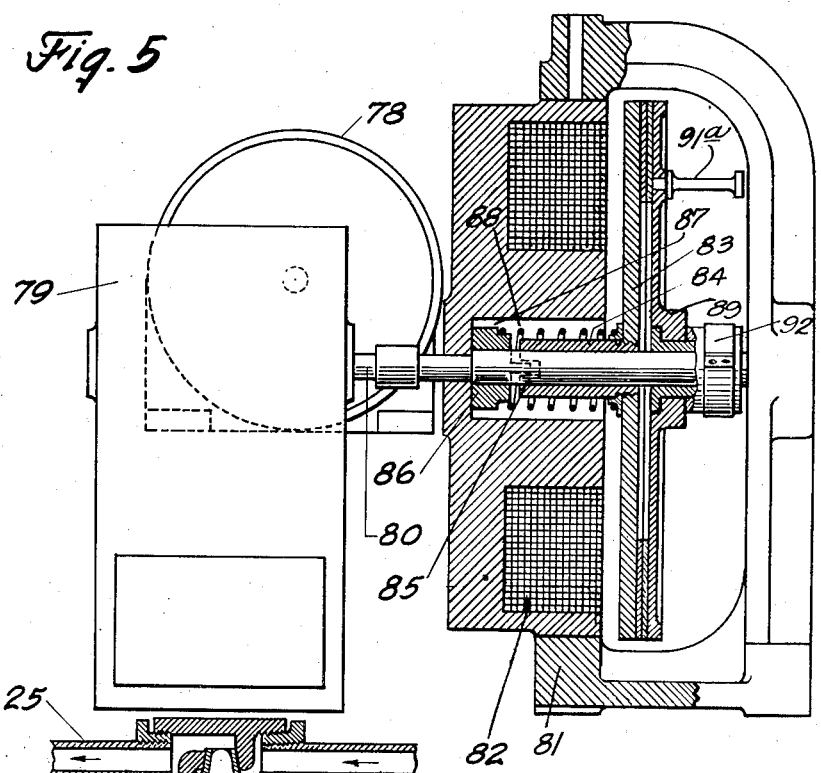
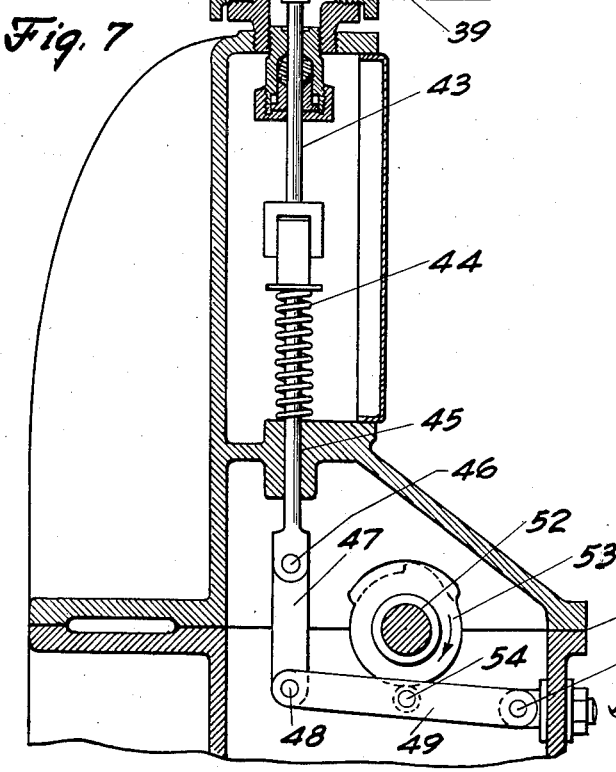
Inventor
Wilfred Sykes.
By Dyrenforth, Lee, Chritton and Wiles
Attys.

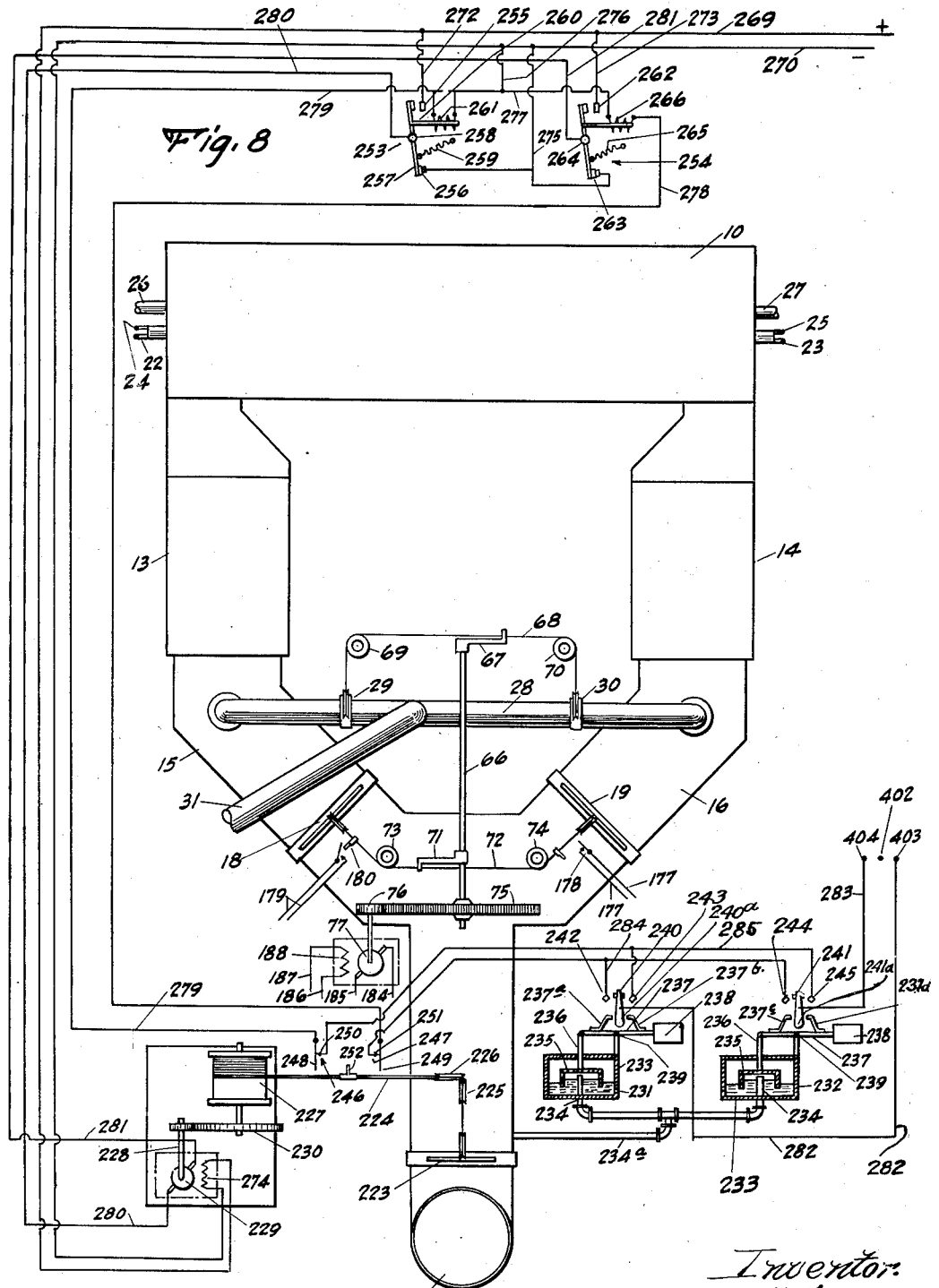

Sept. 29, 1931.  W. SYKES  1,825,372
REGENERATIVE FURNACE CONTROLLING APPARATUS
Filed Jan. 22, 1930  10 Sheets-Sheet 7
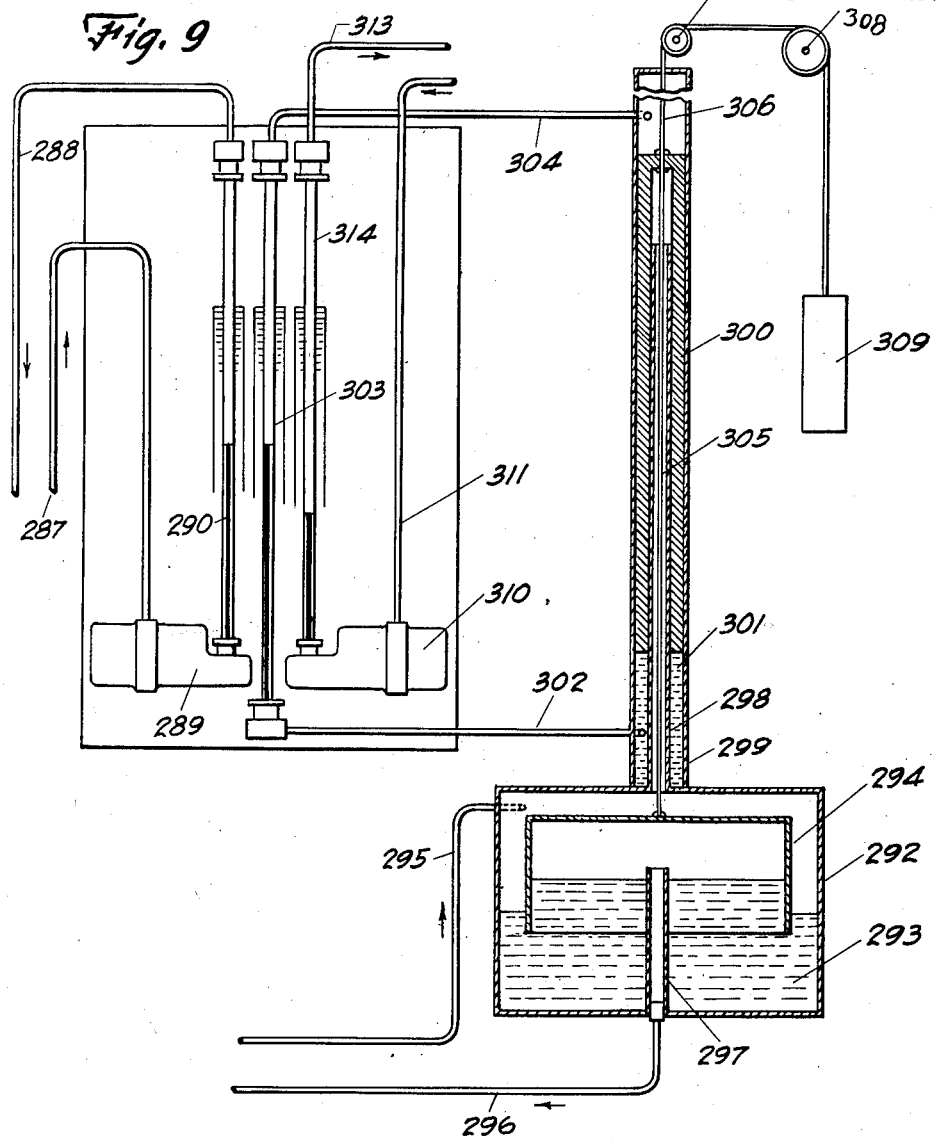
Inventor:
Wilfred Sykes.
By Dyrenforth, Lee, Chritton and Wiles
Attys.

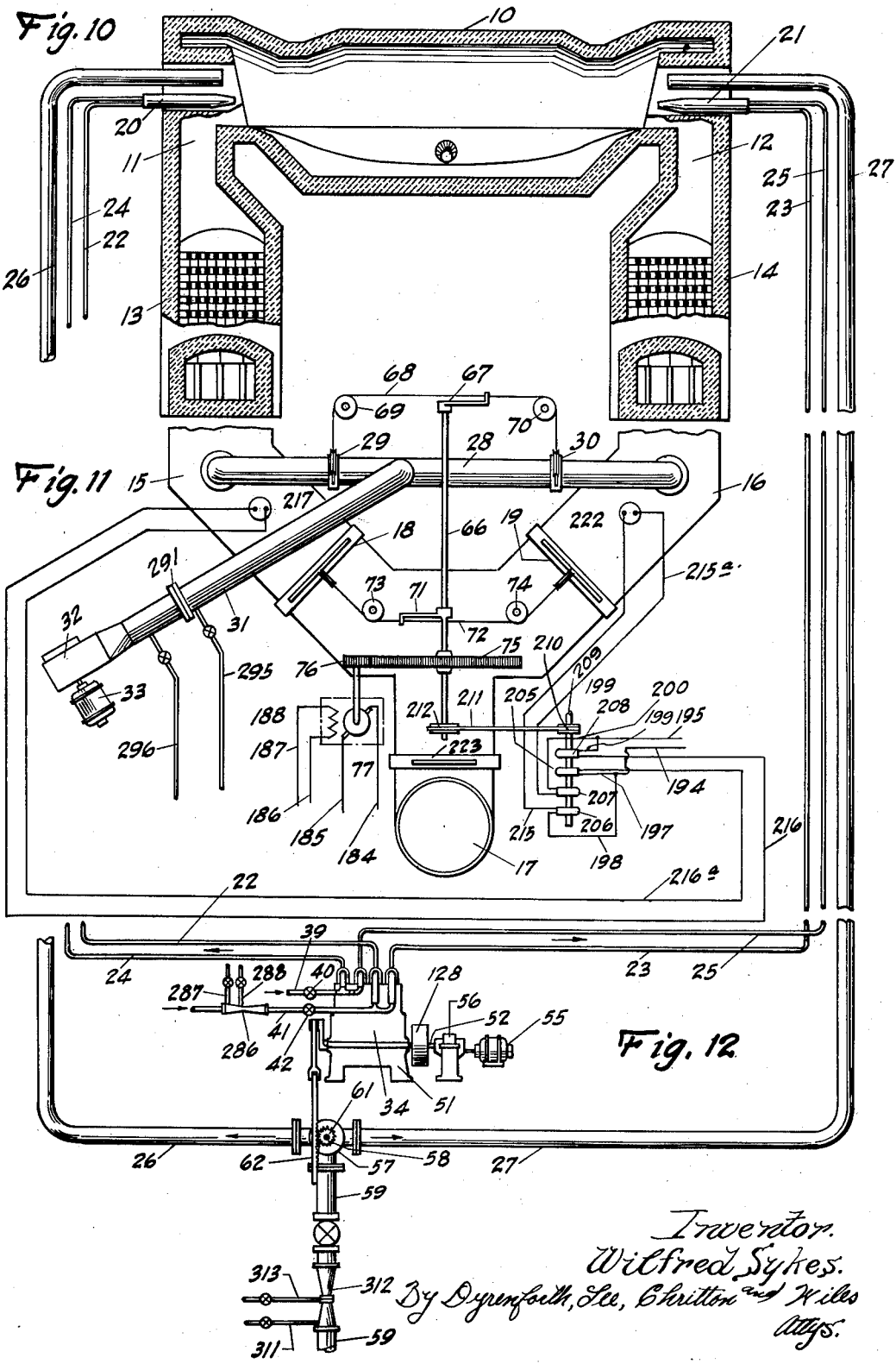

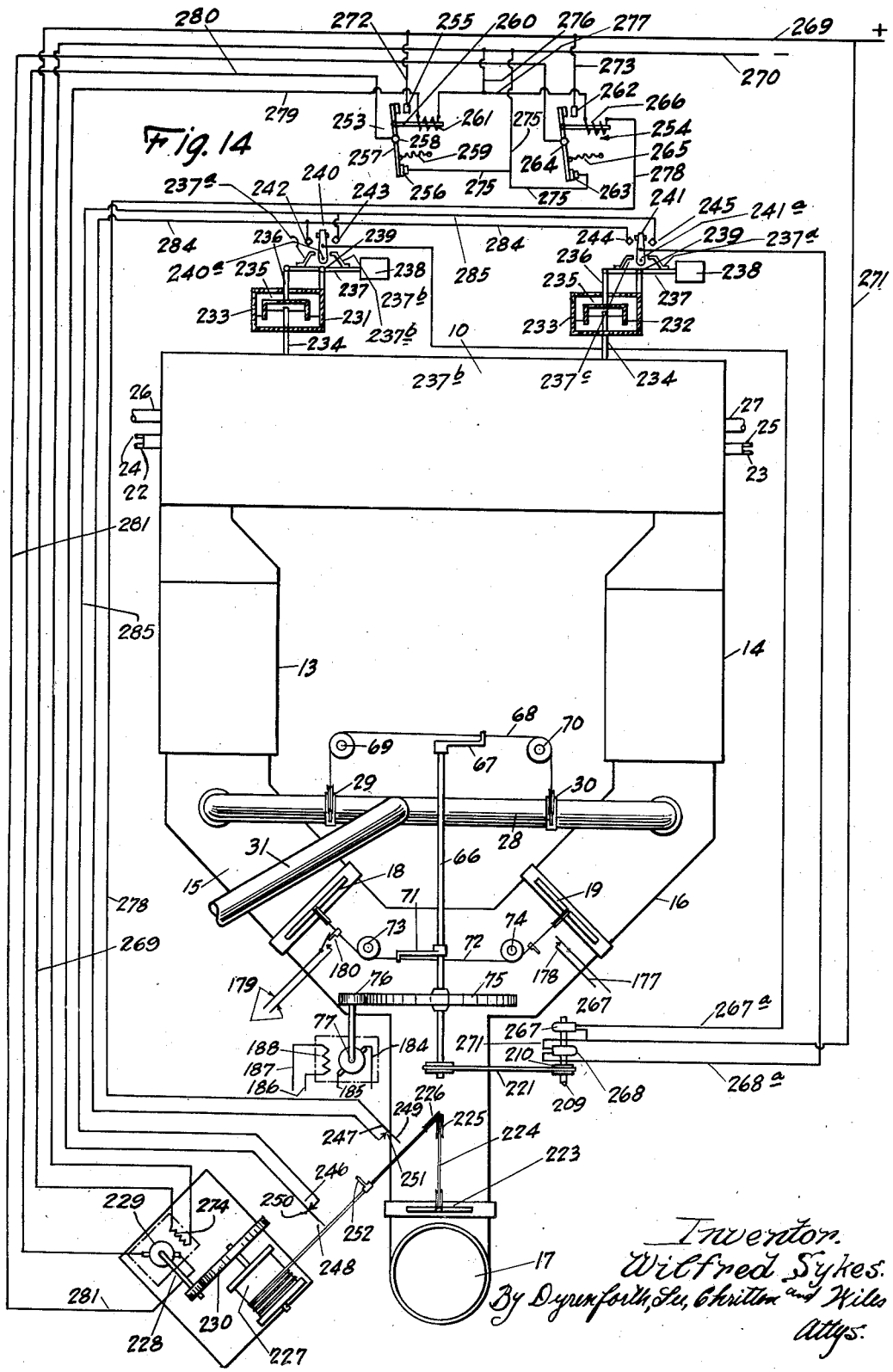

Patented Sept. 29, 1931

1,825,372

UNITED STATES PATENT OFFICE

WILFRED SYKES, OF CHICAGO, ILLINOIS

REGENERATIVE-FURNACE-CONTROLLING APPARATUS

Application filed January 22, 1930. Serial No. 422,616.

My invention relates to improvements in means for controlling the operation of regenerative furnaces comprising, in accordance with common practice, regenerative, or checker chambers communicating with opposite ends, respectively, of the furnace proper and through which the gases passing from the furnace proper are conducted alternately to heat these chambers preliminary to their use for preheating the air supplied to the furnace proper for supporting combustion, or both the air and gas supplied to the furnace proper for combustion purposes, it being understood that the fuel and combustion-supporting air are supplied alternately to opposite ends of the furnace proper.

The regenerative chamber at one end of the furnace proper receives the heated gases for heating it during the introduction of the fuel and air into the opposite end of the furnace proper and the other regenerative chamber serves to heat the air, or air and gas, supplied to the furnace proper as stated, the chambers referred to reversely functioning when the furnace is fired at its opposite end.

It is obvious that an essential feature of such a furnace is the regulation of the temperature of the regenerative chambers so that the air, or air and gas, as the case may be, is preheated to the maximum desirable value and that the chambers at each end of the furnace proper be maintained within the same temperature range so that the air, or air and gas, entering the furnace proper, will be of substantially the same temperature at either end of the furnace. If this is not the case the operation of the furnace will be irregular, as the temperature attained will not be the same when firing from either end.

There are many conditions which tend to cause irregularity in the temperature of the regenerative chambers. For instance, when charging the furnace proper with cold material a large amount of cold air may be drawn in through the doors which tends to chill the outgoing gases, and the cold material charged into the furnace also tends to chill these gases, which has a detrimental effect on the heating of the regenerative chambers. If this condition exists for some time and the furnace is then reversed, the temperature of the ingoing air, or air and gas, as the case may be, after passing through the regenerative chambers will naturally be lower than normal and the flame temperature attained by the fuel burned with such air will be lower than it would had the temperature of the air been normal. If the rate of burning fuel is not correspondingly increased the operation of the furnace will be slowed down, and as a whole the furnace will become cooler. Another condition causing irregularity is the burning of a different amount of fuel at one end of the furnace than at its other end. If the amount burned is not the same the regenerative chamber receiving the gases from the end of the furnace at which the most fuel is burned will become hotter than the other chamber.

Such irregularities are very undesirable and are not conducive to economical operation and the production of a uniform product.

At the present time the reversing of furnaces of the type referred to is usually accomplished by hand. The fuel is first shut off by means of a suitable valve arrangement, the regenerative chamber through which the waste gases were flowing is connected to the air inlet and at the same time the regenerative chamber through which the air was previously flowing is connected to the stack and finally the fuel is applied at the opposite end of the furnace so that it combines with the air through the air inlet after it passes through the preheated regenerative chamber.

One of my objects is to provide for such control of the reversing operations in a regenerative furnace that substantially uniform temperature conditions may be produced at opposite ends of the furnace in the supplying of fuel alternately thereto.

Another object is to provide for the automatic reversing of the furnace at predetermined time intervals.

Another object is to provide for the automatic reversing of the furnace responsive to the heating of the regenerative chambers to a predetermined temperature.

Another object is to provide for the automatic reversing of the furnace responsive to a predetermined lapse of time or to the attainment of temperature conditions in the regenerative portion of the furnace before the lapsing of such time interval.

Another object is to provide in an apparatus having the foregoing characteristics for the reversing of the furnace at any time, if desired, by manual control.

Another object is to provide for the automatic reversing operations in accordance with the several ways above mentioned by simple and positively operating mechanism.

Another object is to provide novel, simple and effective means for the supplying of fuel and combustion supporting air to the furnace in the proper proportions.

Another object is to provide in a regenerative furnace for the regulation of the draft in the furnace when fired from either end to the end that the desired furnace condition will exist; and other objects as will be manifest from the following description.

Referring to the accompanying drawings:

Figure 1 is a view in longitudinal sectional elevation of the furnace proper, together with the regenerative chambers and the fuel and air supplying means of a furnace construction embodying my invention.

Figure 1ᵃ is a plan view of the stack of the furnace, together with the connections between it and the regenerative chambers, the air-supplying means, and the mechanism for regulating the latter and communication of said connections with the stack, together with certain of the electrical apparatus employed.

Figure 1ᵇ is a view in side elevation, somewhat diagrammatic, of certain of the mechanism controlling the supplying of fuel and air to the furnace.

Figure 5 is a view in elevation, partly sectional, of timing mechanism forming a part of the apparatus.

Figure 6 is a section taken at the line 6 on Fig. 3 and viewed in the direction of the arrow.

Figure 7 is an enlarged broken section taken at the line 7 on Fig. 3 and viewed in the direction of the arrow.

Figure 8 is a plan view of the furnace structure shown in Fig. 1 illustrating a portion of the electrical apparatus, together with the circuit connections therefor, for controlling the draft in the furnace.

Figure 9 is a view in elevation, partly sectional and with certain parts broken away, of the apparatus for controlling the proportion of the fuel and air supplied to the furnace.

Figure 10 is a duplicate of Fig. 1.

Figure 11 is a view like Fig. 1ᵃ of a modification of the apparatus.

Figure 12 is a duplicate of Fig. 1ᵇ.

Figure 1:
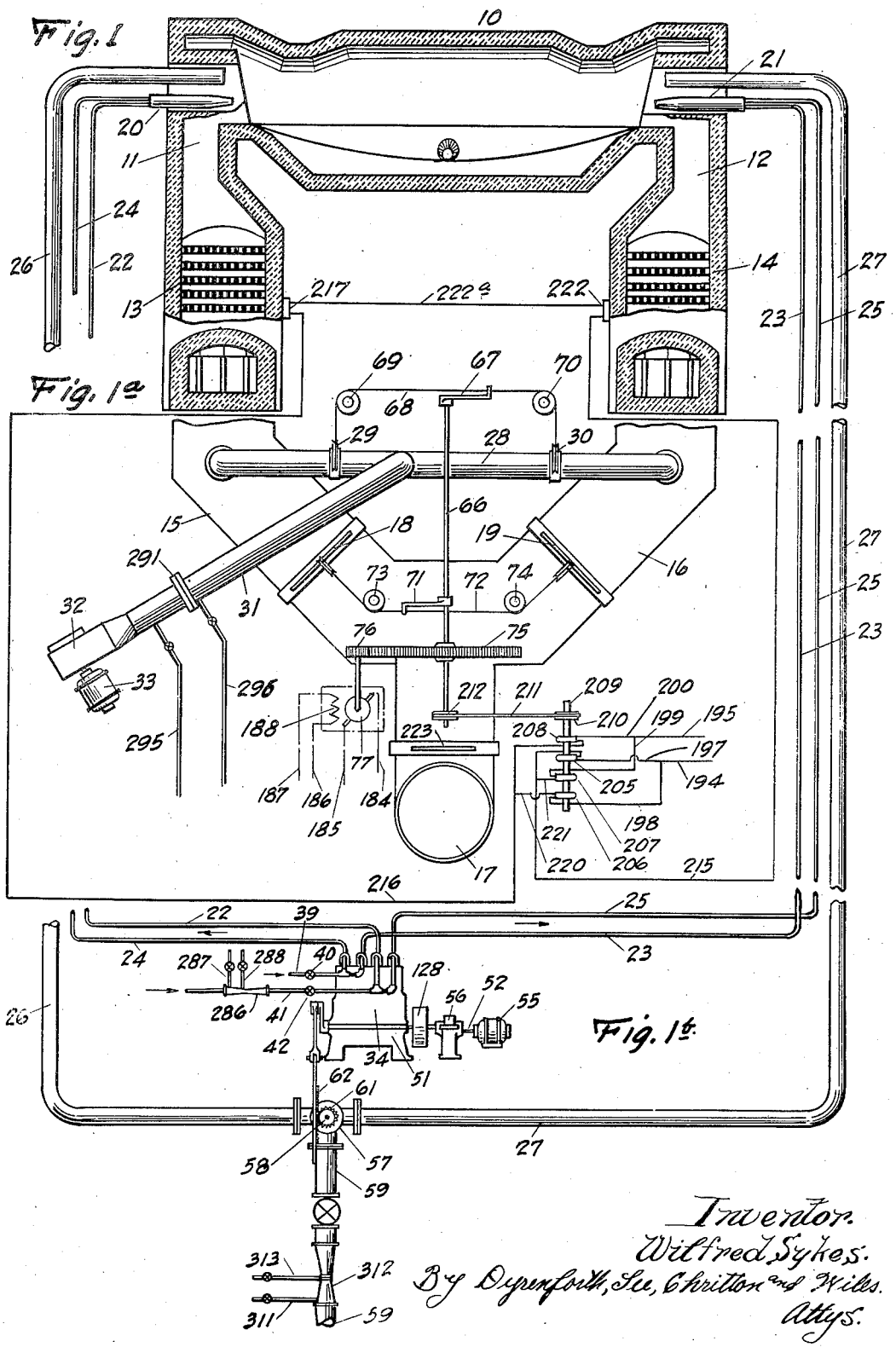

Figure 14, a view like Fig. 8 of the modified apparatus.

The drawings show the invention as applied to a regenerative furnace employing either oil or coke oven gas as the fuel, though without any intention of limiting the invention thereto.

The furnace proper referred to is represented at 10, its opposite ends being connected by passages 11 and 12 with regenerative, or checker, chambers 13 and 14, respectively, the exit ends of which connect with pipes 15 and 16, respectively, opening into a stack 17, the valves, shown as vertically reciprocable gate valves for controlling the alternate opening of the pipes 15 and 16 to the stack 17, being represented at 18 and 19, respectively.

Extending into the opposite ends of the furnace proper are oil burners 20 and 21, respectively, the fuel oil pipes leading thereto being represented at 22 and 23, and the steam pipes commonly provided for supplying steam to the burners, at 24 and 25.

The pipes through which the coke oven gas may be supplied to the opposite ends of the furnace proper 10 are represented at 26 and 27, respectively.

The furnace also comprises means for supplying air under pressure to the regenerative chambers 13 and 14 in alternation for the preheating of such air in its travel into the furnace proper for supporting combustion. These means comprise a pipe 28 opening at its opposite ends into the pipes 15 and 16 between the regenerator chambers and the valves 18 and 19 and provided with vertically movable gate valves 29 and 30 (represented, however, diagrammatically in Fig. 1ᵃ). A pipe 31 connects with the pipe 28 between the valves 29 and 30 and is equipped with a blower 32 driven by a motor 33 by which air under pressure is supplied to the chambers 13 and 14 alternately.

The flow of oil and steam to the burners 20 and 21 is controlled by the valve mechanism represented generally at 34 (Figs. 1ᵇ, 3, 6 and 7), this mechanism comprising four valve structures 35, 36, 37 and 38, these valve structures controlling the flow to the pipes 24, 25, 22 and 23, respectively, the valves 35 and 36 thus being steam valves and the valves 37 and 38 oil valves. The valve structures 35 and 36 are connected with a steam line 39 having a shut-off and regulating valve 40 and the valve structures 37 and 38 are connected with an oil line 41 having a shut-off and regulating valve 42.

Each of the structures just referred to is of the construction shown in Fig. 7 and comprises a reciprocable valve proper 43 normally held seated in closed condition by a coil spring 44 cooperating with a stem 45 fastened to the stem of valve proper 43, the lower end of the stem 45 being pivotally connected at 46 with a link 47 which in turn is pivoted at 48 to the outer end of a lever 49 fulcrumed at 50 on a housing 51 supporting the valve structures above referred to.

Extending lengthwise through the housing 51 and journalled therein is a shaft 52 provided with four cams adapted to be rotated against rollers projecting laterally from the levers 49, one of such cams being provided for cooperation with each of said levers. In Fig. 7 one of the cams referred to is represented at 53 and the roller on the lever 49 with which it cooperates, at 54. The cams referred to are so shaped and are so placed annularly about the shaft 52 that in the rotation of this shaft, as hereinafter described, in clockwise direction in Fig. 7 one of the oil valves and the one of the steam valves cooperating therewith will be moved to open position or closed position depending upon the position occupied by these valves in the rotation of the shaft and the other steam valve and oil valve will be reversely operated. In other words, assuming that the steam valve 35 and the oil valve 37 are open (in which position the steam valve 36 and the oil valve 38 will be closed), and the shaft 52 is then rotated, the steam valve 35 and the oil valve 37 will close and thereafter the steam valve 36 and the oil valve 38 will open, the valves remaining in the respective positions in the rotation of the shaft, as stated, throughout approximately 180°. Upon the rotation of the shaft throughout the remaining 180° the position of the valves will be reversed. The cams referred to are furthermore so shaped and disposed that the steam valves 35 and 36 will remain open for a short length of time after the oil valves with which they cooperate close, to insure the purging of the oil from the pipes leading to the furnace proper, and will open slightly in advance of the oil valves to ensure better mixture of the oil and steam.

The shaft 52 is shown as driven by an electric motor 55, the operation of which is hereinafter described, through reduction gearing of any desired construction represented at 56.

The mechanism for controlling the supplying of coke oven gas to the burners alternately is represented generally at 57 and comprises a three-way valve 58 located at the juncture between a pipe 59, leading from the supply of coke oven gas, and the adjacent ends of the pipes 26 and 27. The valve proper of this device is represented at 60 and is so constructed, as is well known in practice, that when turned to one position it will establish communication between the pipes 59 and 27, shutting off the pipe 26 to pipe 59, and when turned to another position will open the pipe 26 to the pipe 59 and close the pipe 27 to the latter. The valve proper 60 is shown as equipped with a pinion 61 meshing with a rack 62 slidable in a guide frame 63 and pivotally connected at its upper end, as represented at 64, to a crank 65 fixed on an end of the shaft 52, the arrangement of the parts being such that upon the final movement of the valve in moving throughout each 180° the flow of gas to the furnace proper will be reversed.

The mechanism for actuating the valves 18, 19, 29 and 30 comprises a shaft 66, provided with a crank 67 connected with a cable 68 supported on pulleys 69 and 70 and connected at its opposite ends with the valves 29 and 30, whereby upon rotation of this shaft in one direction the valve 29 will close and the valve 30 will open and upon reverse rotation the valves will reversely operate. The shaft 66 is also provided with a crank 71 connected with a cable 72 extending over pulleys 73 and 74 with its ends connected with the valves 18 and 19, this crank operating these valves in the same way as the valves 29 and 30 are operated. The arrangement of the parts just described is such that in the rotation of the shaft 66 in one direction the valves 18 and 30 close and the valves 19 and 29 open, and in the rotation of the shaft 66 in the opposite direction the valves 18 and 30 open and the valves 19 and 29 close.

The shaft 66 is shown as provided with a gear 75 meshing with a pinion 76 connected with a reversible motor 77 controlled as hereinafter described for oscillating the shaft 66.

In the particular illustrated embodiment of my invention the motors 55 and 77 are operated to effect the reversing operations above referred to either in accordance with the lapsing of a predetermined time interval or responsive to certain temperature conditions of the products of combustion at the outlet ends of the regenerative chambers should such temperature reach such predetermined degree before the time interval referred to has lapsed, or under manual control, as desired, a description of the illustrated mechanism for this purpose being as follows:

The mechanism referred to comprises, as one of the elements thereof, the machine shown in detail in Fig. 5 and comprising a continuously operating motor 78 having gear connection, through gearing of any desirable construction located in a gearing housing 79 with a shaft 80. The shaft 80 extends through a stationary magnet 81, the winding of which is represented at 82, and beyond the magnet 81 is provided with a disk 83 of magnetic material. The disk 83 is shown as rigidly mounted on an end of a sleeve 84 surrounding the shaft 80 and driven by this shaft through the medium of the clutch represented at 85 formed of a clutch collar 86 rigid on the shaft 80 and located within a recess 87 in the core of the magnet 81, the disk 83 being normally forced, to the position shown in Fig. 5 in which it is spaced from the magnet 81, by a coil spring 88.

Journalled on the shaft 80 beyond the disk 83 is a disk 89 with which the disk 83 has driving contact when the magnet 81 is deenergized. The disk 89 (Fig. 2) is provided with an arcuate series of holes 90 into which pins, as for example those illustrated at 91 and 91ª, may be selectively positioned.

Journalled on the shaft 80 beyond the disk 89 is a walking beam 92 adapted when rocked to one position to bridge a pair of stationary contacts 93 and 94 and when rocked in the opposite direction to bridge a pair of stationary contacts 95 and 96. A weight 97 secured to the lower end of a cable 98 and connected to the disk 89 and extending part way about its periphery, tends to rotate the disk 89 in counterclockwise direction in Fig. 2.

The parts described are so positioned that a pin or pins located in holes 90 of the series thereof, extends above the walking beam 92 and in intersecting relation thereto.

Figure 2:
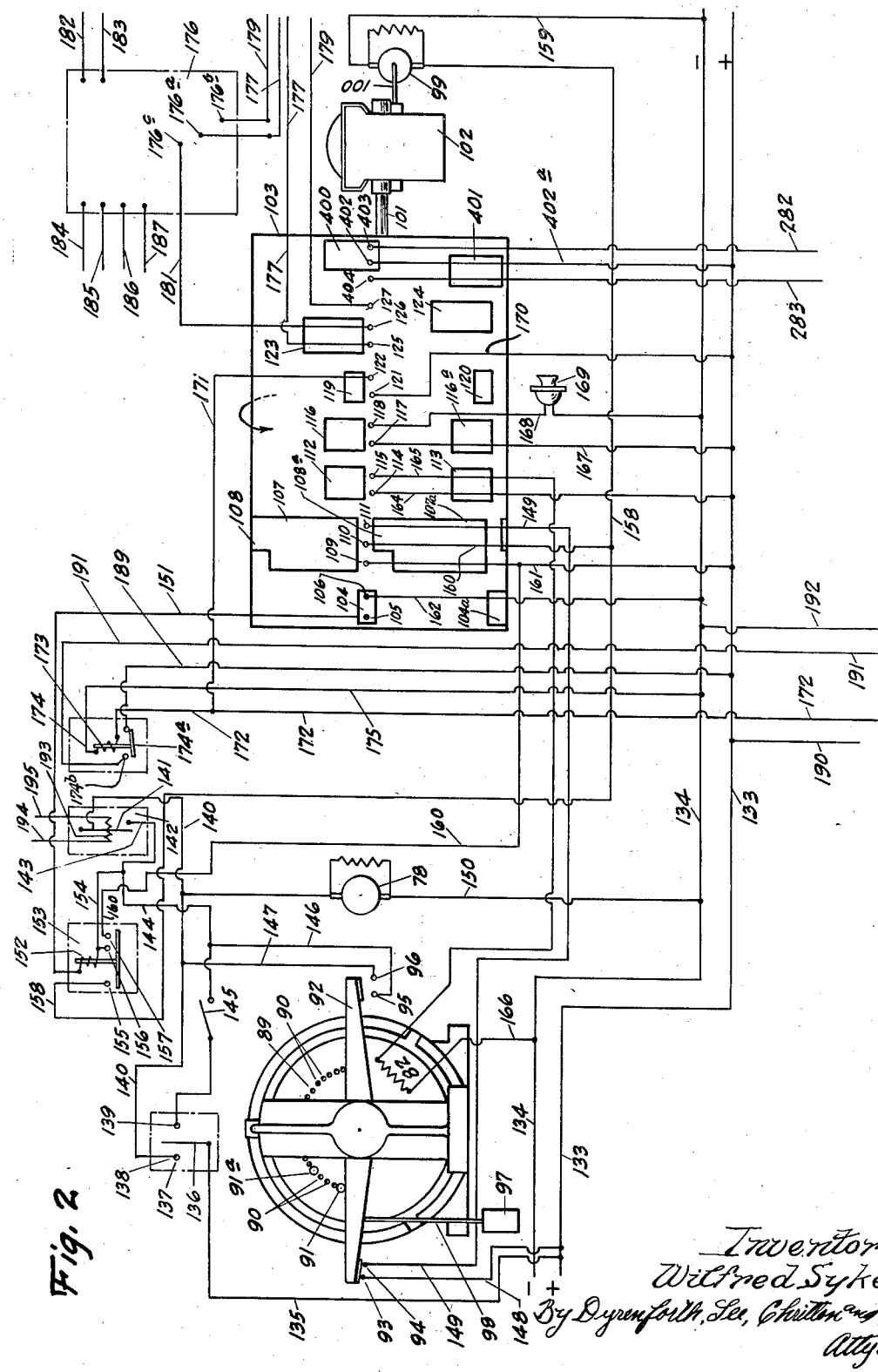
Figure 2 is a view, partly diagrammatic, of certain of the electrical apparatus, together with the electrical circuits controlling them, forming a part of the structure.

It may be here stated that assuming the motor 78 to be running and the magnet 81 deenergized, the motor drives the disk 89 in clockwise direction in Fig. 2 thereby rotating the disk 89 against the action of the weight 97, the pin 91ª upon engaging the walking beam 92 rocking the latter in a clockwise direction in Fig. 2 to disengage from the contacts 93 and 94 and engage with the contacts 95 and 96. Following this operation the magnet 81 is energized, as hereinafter described, thereby releasing the disk 83 from engagement with the disk 89, whereupon the weight 97 automatically rotates the disk 89 in counterclockwise direction in Fig. 2, the pin 91 engaging the walking beam 92 and rocking the latter into engagement with the contacts 93 and 94 and disengaging from the contacts 95 and 96. When this occurs the circuit is automatically broken through the magnet 81 whereupon the disk 83 automatically reengages the disk 89 rotating the latter in clockwise direction from the position shown in Fig. 2 to a position in which the pin 91ª again engages the walking beam 92 to rock the latter in clockwise direction. Thus there is provided a machine which makes and breaks engagement at the contacts 93 and 94 and 95 and 96 pursuant to the lapsing of a selected predetermined time interval.

The controlling mechanism also comprises an electric motor represented at 99 the armature shaft 100 of which is connected with a shaft 101 through the medium of any suitable reduction gearing mounted in a gear case 102. The shaft 100 has rigid thereon a drum represented at 103 (Fig. 2) this drum being shown by a developed view thereof. The drum 103, the body of which is of current insulating material, is provided at its periphery, at one end of the drum, with diametrically opposed contact plates 104 and 104ª for cooperation alternately with stationary contacts 105 and 106. Next to the contacts 104 and 104ª are contacts 107 and 107ª diametrically disposed and having the narrow end portions 108 and 108ª, respectively, these plates cooperating with stationary contacts 109, 110 and 111, the portions 108 and 108ª cooperating with the contacts 110 and 111 only. Next to the contacts 107 and 107ª are diametrically opposed contacts 112 and 113 which cooperate with stationary contacts 114 and 115, respectively. Next to these contact plates is a pair of diametrically opposed plates 116 and 116ª which cooperate alternately with stationary contacts 117 and 118. Next to the plates 115 and 116 are diametrically opposed contacts 119 and 120 which alternately cooperate with stationary contacts 121 and 122. Next to the plate 119 and in alinement therewith longitudinally of the drum is a contact plate 123 and located opposite to this contact plate but slightly offset therefrom lengthwise of the drum, is a contact plate 124. The contact plate 123 cooperates with stationary contacts 125 and 126 and the contact plate 124 cooperates with the stationary contact 126 and a stationary contact 127.

Next to the plate 123 is a plate 400, one end of which is in line with the plate 104, and directly opposite to plate 400, but slightly offset therefrom longitudinally of the drum is a contact plate 401. The contact plate 400 cooperates with stationary contacts 402 and 403, and the contact plate 401 cooperates with the stationary contact 402 and a stationary contact 404.

The various electrical connections between the stationary contacts above referred to and the other elements of the electrical apparatus will be hereinafter described.

The controlling mechanism also comprises a drum 128 (shown in Fig. 3 by a developed view) rigid on the shaft 52 and comprising diametrically opposed contact plates 129 and 130 insulated from each other and cooperating alternately with stationary contacts 131 and 132.

The various circuit connections between certain of the above described parts of the controlling mechanism and the other electrical elements of this controlling mechanism will now be described.

The electric current line wires are represented at 133 and 134. A wire 135 leads from the wire 133 to the movable contact arm 136 of a hand-throw switch 137, the stationary contacts of which are represented at 138 and 139. The contact arm 136 is thrown into engagement with the contact 138 when the apparatus is to be operated automatically and into engagement with the contact 139 when to be manually controlled.

The contact 138 connects, by a wire 140, with the movable contact 141 of a switch device 142, the fixed contact 143 of which connects by a wire 144 with the contact 139 of the hand-throw switch 137, this wire containing a push-button switch 145. The contact 95 connects with the wire 144 by a wire 146; the contact 96 with the wire 140 by a wire 147; the contact 93 with the wire 133 by a wire 148, and the contact 94 with the contact 111 by a wire 149. The motor 78 is interposed in a wire 150 connected at opposite ends with the wires 134 and 140.

The stationary contact 105 connects by a wire 151 with one end of the winding 152 of a relay 153, the other end of this winding being connected with a wire 154 connected with the wire 144 between the switch 145 and the contact 143. The relay 153 has three stationary contacts 155, 156 and 157. The contact 155 connects by a wire 158 with one of the terminals of the motor 99 the other terminal of this motor being connected by a wire 159 with the line wire 134. The contact 156 is connected with the wire 154 and the contact 157 connects with a wire 160 with a wire 161 which in turn is connected with the line wire 133.

The contact 106 of the drum 103 connects by a wire 162 with the line wire 134. The contact 109 connects with the wire 161, and the contact 110 with the wire 158 by a wire 163.

The contact 114 connects with the wire 133 by a wire 164; the contact 115 connects with one end of the winding 82 of the magnet 81 by a wire 165, the other end of the magnet winding 82 being connected with the line wire 134 by a wire 166; the contact 117 connects with the line wire 133 by a wire 167 and the contact 118 connects with the line wire 134 by a wire 168 having a signaling device represented at 169 and which may be of any desirable construction, as for example an electric horn, interposed therein.

The contact 121 connects with the line wire 133 by a wire 170 and the contact 122 connects with a wire 171 which connects with a wire 172 between the ends of the latter, one end of the wire 172 being connected with one end of the winding 173 of a relay 174, the other end of this winding being connected by a wire 175 with the line wire 134.

As a preface to the description of the circuits controlled by the contacts 125, 126 and 127 which cooperate with the contact plates 123 and 124, it may be stated that these contacts or plates are provided for controlling, through contactor-equipped electrical controller apparatus represented at 176 and which may be a magnetic automatic controller such as commonly used, the operations of the motor 77 which actuates the stack valves 18 and 19 and the air valves 29 and 30.

The contact 125 is connected with a wire 177 attached to the "forward" terminal 176ᵃ of the controller 176 with a limit switch 178 (Fig. 8) interposed therein and the contact 127 connects with a wire 179 attached to the "reverse" terminal 176ᵇ of the controller 176 with a limit switch 180 interposed therein. A wire 181 leads from the contact 126 and attaches to the control circuit line terminal 176ᶜ of the controller 176. The controller 176 is connected with line wires 182 and 183 through which current is supplied, under the control of the plates 123 and 124 for actuating contactors (not shown) forming a part of the controller 176. The controller 176 has four wires 184, 185, 186 and 187 leading from the motor-lead terminals of the controller 176, the wires 184 and 185 being connected with the brushes of the motor 77 and the wires 186 and 187 with the opposite ends of the field coil 188 thereof. The mechanism is such that when the plate 123 bridges the contacts 125 and 126 (the limit switch 178 being closed), the controller 176 would be conditioned for supplying current to the motor 77 to rotate it in forward direction, and when the plate 123 is out of engagement with these contacts and the plate 124 bridges the contacts 126 and 127 (the limit switch 180 being closed) the controller 176 would be conditioned for supplying current to the motor 77 to drive it in the "reverse" direction. The limit switches 178 and 180 are provided for the purpose of automatically breaking the circuit of the motor 77 when the valves referred to reach the end of their movement in either direction.

Continuing a description of the circuit connections of the mechanism in so far as they have been described, the movable contact 174ᵃ of the relay 174 connects by a wire 189 with the line wire 133, and the wire 172, connected with one end of the coil 173 of this relay, connects with the contact 132 of the contact drum 128, the contact 131 of this drum connecting by a wire 190 with the line wire 133.

The fixed contact 174$^b$ of relay 174 connects by a wire 191 with one of the terminals of the motor 55, the other terminal of this motor being connected by a wire 192 with the line wire 134.

The apparatus shown comprises an electrical indicating and contact-making pyrometer such as is commonly known in the art and which is actuated by the relatively weak current produced by thermocouples hereinafter referred to and associated therewith, to close a switch when such voltage supplied to the pyrometer reaches a predetermined potential and open said switch when the voltage drops below such potential such pyrometers operating only when current is supplied thereto in one direction. The pyrometer referred to is represented diagrammatically in the drawings the switch thereof being the hereinbefore referred to switch 142 which is caused to close when the voltage supplied by the thermocouples to the coil of the pyrometer and represented diagrammatically at 193 reaches a predetermined potential.

Continuing a description of the circuit connections, the opposite ends of the coil 193 of the pyrometer connects with wires 194 and 195, the wire 194 having branches 197 and 198 and the wire 195 branches 199 and 200. The wires 197, 198, 199 and 200 connect with the internal contacts 201, 202, 203 and 204 of tiltable mercury switches 205, 206, 207 and 208, respectively. The switches 201—204 are mounted on a rock shaft 209 provided with a sprocket 210 by which it is connected with the shaft 66 through a sprocket chain 211 engaging the sprocket 210 and a sprocket 212 on the shaft 66. The switches 206 and 207 are reversely disposed relative to the switches 208 and 205 as shown, whereby when the shaft 209 is rocked in one direction one pair of these switches will be in circuit-closing condition and the other pair out of such position and when this shaft is rocked in the opposite direction the position of these several switches will be reversed.

The other internal contacts 213 and 214 of the switches 205 and 208 connect by wires 215 and 216, respectively, with thermocouple devices 222 and 217 which are associated with the regenerative chambers 14 and 13, respectively. The other internal contact 218 of the switch 206 connects, by a wire 220, with the wire 216, and the other internal contact 219 of the switch 207 connects, by a wire 221 with the wire 215. A wire 222$^a$ connects together the negative terminals of the thermocouples.

The thermocouples are provided to control the operation of the electrical furnace-reversing mechanism responsive to temperature conditions in the regenerative portions of the furnace. In the particular apparatus now being described the control referred to is effected responsive to temperature conditions at both of the regenerative portions of the furnace, to the end of rendering the operation of the furnace more uniform. In this arrangement the thermocouples are located toward the junctures of the stack flue and the regenerative chambers and in the path of the gases flowing through the regenerative chambers, it having been found in practice that satisfactory results are produced by locating the thermocouples substantially midway between the ends of the heat-interchanging passages of the regenerative chambers as shown in the drawings.

In the arrangement shown, the electromotive force generated by either of the thermocouples is counteracted, or bucked, to a greater or less extent by the electromotive force generated by the other of the thermocouples, so that the amount of voltage supplied to the pyrometer by the thermocouples is equal to the difference between the electromotive forces generated by the respective thermocouples.

A description of the operation of the apparatus as to the parts thereof above described is as follows:

Assuming the parts of the apparatus to be in the position shown in the drawings and it is desired that the reversing operations of the furnace be effected automatically the operator engages the movable contact 136 with the stationary contact 138 of switch 137 whereupon the motor 78 for driving the disk 83 starts into operation and continuously runs so long as the switch 137 remains conditioned as stated, the circuit for operating this motor being as follows: Wire 133, wire 135, contacts 136 and 138, wire 140, and wire 150 to line wire 134.

In the illustrated positions of the parts of the apparatus the oil valve 37 and steam valve 35 are open and the oil valve 38 and the steam valve 36 are closed; air valve 29 is open, and air valve 30 is closed; and stack valve 19 is open and stack valve 18 is closed. Thus fuel is introduced into the left-hand end of the furnace-chamber 10, air is forced through the regenerative chamber 13 to support combustion of the fuel in the furnace and the hot gases from the furnace discharge through the regenerative chamber 14 to the stack.

In accordance with the preferred illustrated embodiment of my invention now being considered, the furnace-reversing operations under automatic control are effected responsive to temperature conditions at the regenerative portions of the furnace, viz., to a predetermined temperature differential between the gases being heated in the regenerative portion of the furnace and the heat in the regenerative portion of the furnace and in which the air, or air and gas, for supporting combustion in the furnace is passed; or upon the lapsing of a predetermined time interval, should such temperature differential not be reached before such time-lapse.

Continuing the description of the operation of the apparatus with the parts positioned as shown the operation of the motor 78 in rotating the disk 89 in clockwise direction in Fig. 2 moves the pin 91ª, into engagement with the walking beam 92 rocking the latter in clockwise direction in Fig. 2 thereby breaking the circuit between the contacts 93 and 94, and closing the circuit at the contacts 95 and 96 with the result of closing the relay 153 the circuit for energizing this relay being as follows: Wire 133, wire 135, contacts 136 and 138, wire 140, wire 147, contacts 96 and 95, wire 146, wire 144, wire 154, coil 152, wire 151, plate 104, wire 162 to wire 134.

The closing of the relay 153 starts the motor 99 into operation through the establishment of the following circuit: Wire 133, wire 161 to wire 160, contacts 157 and 155, wire 158, motor 99, and wire 159 to 134.

Energizing the motor 99 starts the master drum 103 revolving in the direction of the arrow in Fig. 2 through the medium of the speed reduction mechanism 102. The circuit in which the relay 153 is interposed is broken as soon as the plate 104 moves out of engagement with the stationary contacts 105 and 106 which takes place a moment after plate 107 moves into engagement with the fixed contacts 109, 110 and 111 which control the circuit for continuing the operation of the motor 99 by establishing the following circuit: Wire 133, wire 161, contact 109, plate 107, contact 110, wire 163, wire 158, motor 99, wire 159, and wire 134. Positive current also flows to the motor 99 through the following described circuit when the walking beam 92 returns to the position shown in Fig. 2 as hereinafter described, this circuit being as follows: Wire 133, wire 148, contacts 93 and 94, wire 149, contact 111, plate 107, contact 110, wire 163, wire 158, motor 99, wire 159, and wire 134. It will be noted that in the final movement of the plate 107 it disengages from the stationary contact 109 while maintaining the circuit closed between contacts 110 and 111 at the portion 108 of the plate 107, which breaks the circuit to the motor through the contact 109, but maintains the circuit in which the motor 99 is interposed and controlled by the walking beam 92 cooperating with the contacts 93 and 94. This second circuit arrangement is provided for the purpose of immediately apprising the operator of the failure, should it occur, of the return of the walking beam 92 to its starting position shown in Fig. 2, it being noted that if the walking beam 92 does not, upon being released, as hereinafter described, return to its starting position in which the circuit is closed at the contacts 93 and 94, the motor 99 will stop before the drum 103 has been rotated 180° to move the plate 104ª into engagement with the contacts 105 and 106 controlling the relay 153.

The plate 112 in moving into engagement with the contacts 114 and 115 causes the electro-magnet 81 to be energized for unclutching the disk 89 from the drive disk 83 and permitting the disk 89 to rotate in counter-clockwise direction in Fig. 2, under the action of the weight 97, to a position in which the pin 91 engages the walking beam 92 and rocks it to the position shown in this figure. The magnet 81 remains energized only while the plate 112 is in engagement with the contacts 114 and 115 which is for a comparatively short time only and upon such deenergization the disk 89 again becomes automatically clutched to the constantly rotating disk 83 and clockwise rotation of the disk 89 in Fig. 2 is again resumed for carrying the pin 91ª, after the lapsing of the desired predetermined length of time, into engagement with the walking beam 92 to reversely rock the latter.

The circuit thus established for energizing the electro-magnet 81 is as follows: Wire 133, wire 164, contact 114, plate 112, contact 115, wire 165, coil 82 of electro-magnet 81, wire 166, and wire 134.

The contact plate 116 is provided for the purpose of energizing a signalling device such as the electric horn 169 provided for notifying the workmen that the furnace is about to be reversed, the circuit thus established being as follows: Wire 133, wire 167, contact 117, plate 116, contact 118, wire 168, signalling device 169, and wire 134.

The contact plate 119 cooperates with the contacts 121 and 122 to control the closing of the relay 174 by the establishment of the following circuit: Wire 133, wire 170, contact 121, plate 119, contact 122, wire 171, wire 172, winding 173 of relay 174, wire 175, and wire 134. The closing of this relay establishes the circuit of motor 55 through wire 133, wire 189, relay 174, wire 191, motor 55, wire 192, and wire 134,-whereupon the motor 55 starts into operation. The motor 55 is continued in operation through relay 174, after the drum 103 has rotated to a point in which plate 119 is not in engagement with contacts 121 and 122, by the moving of the contact plate 129 into engagement with the contacts 131 and 132 the circuit thus established being as follows: Wire 133, wire 190, contact 131, plate 129, contact 132, wire 172, relay coil 173, and wire 175 to wire 134.

Figure 3:
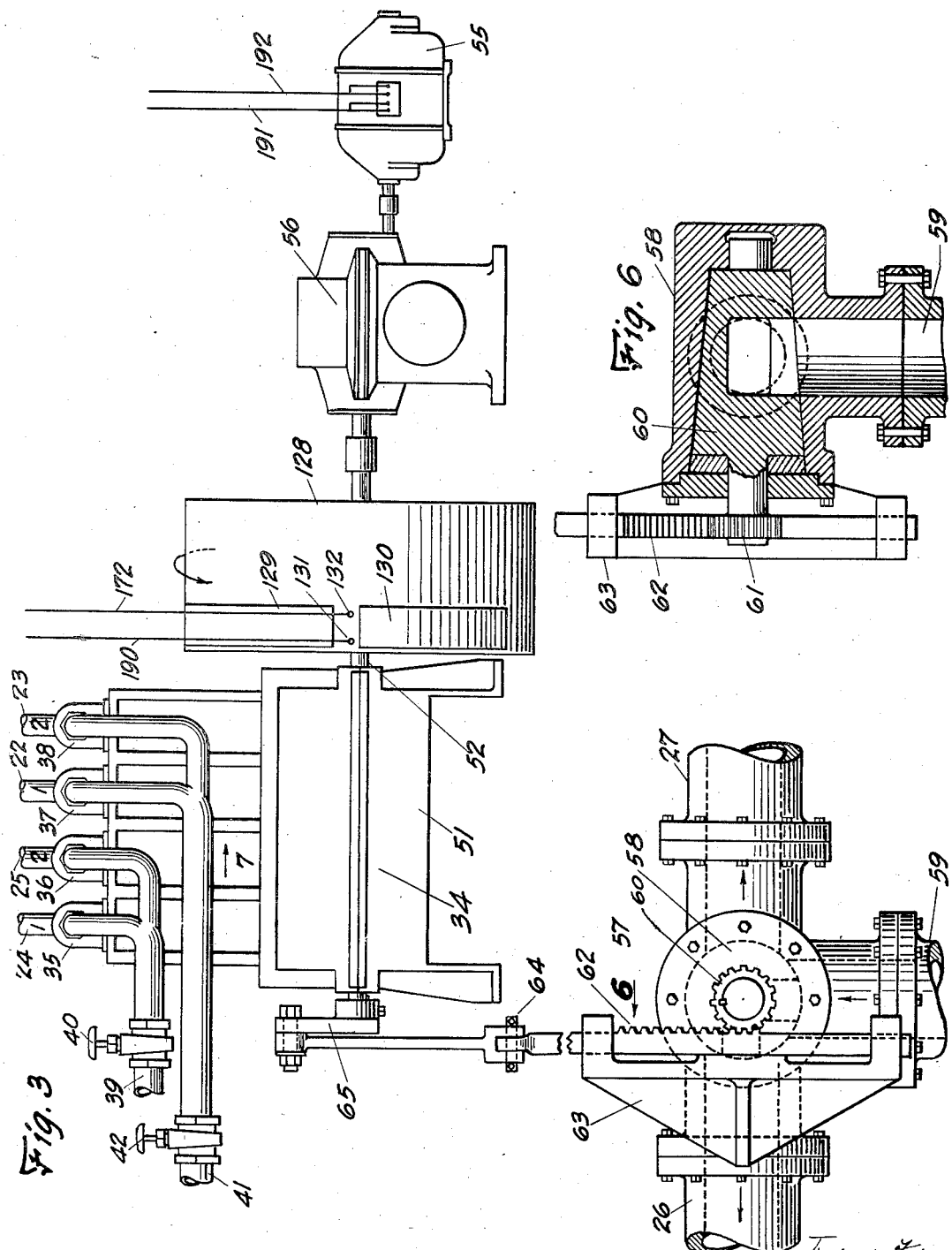
Figure 3 is an enlarged broken view of the apparatus shown in Fig. 1ᵇ.
Figure 4:
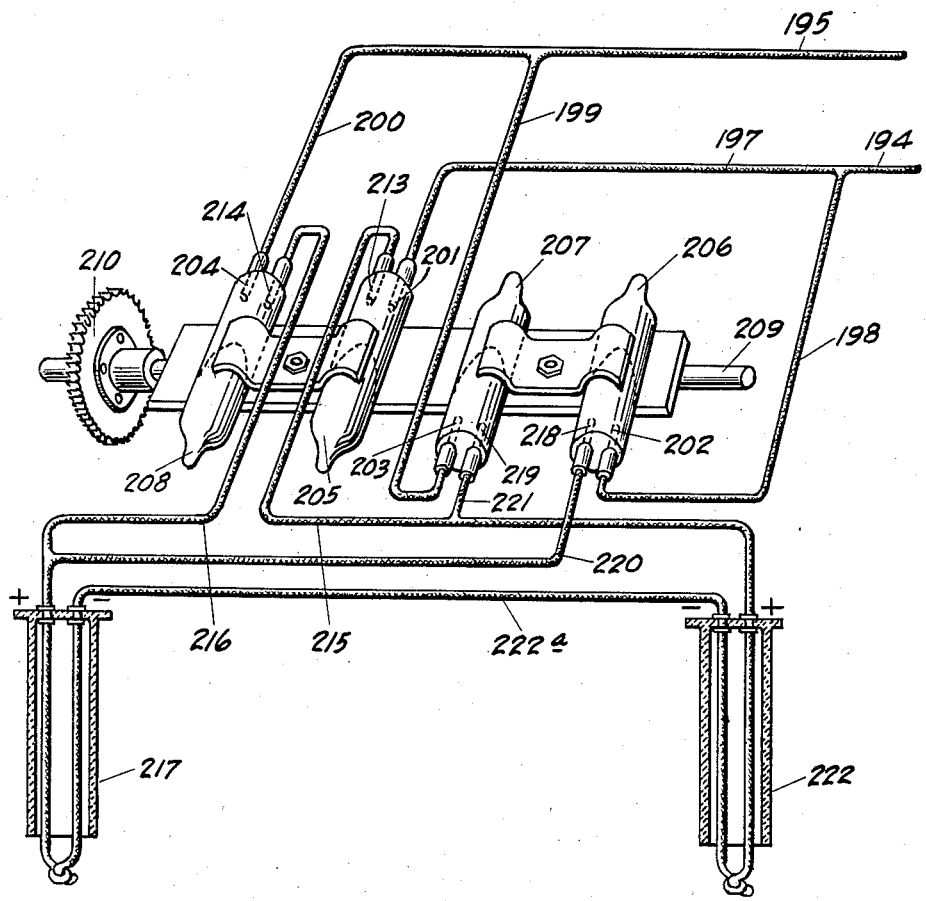
Figure 4 is a perspective view of another part of the electrical apparatus forming a part of the structure.
Figure 13:
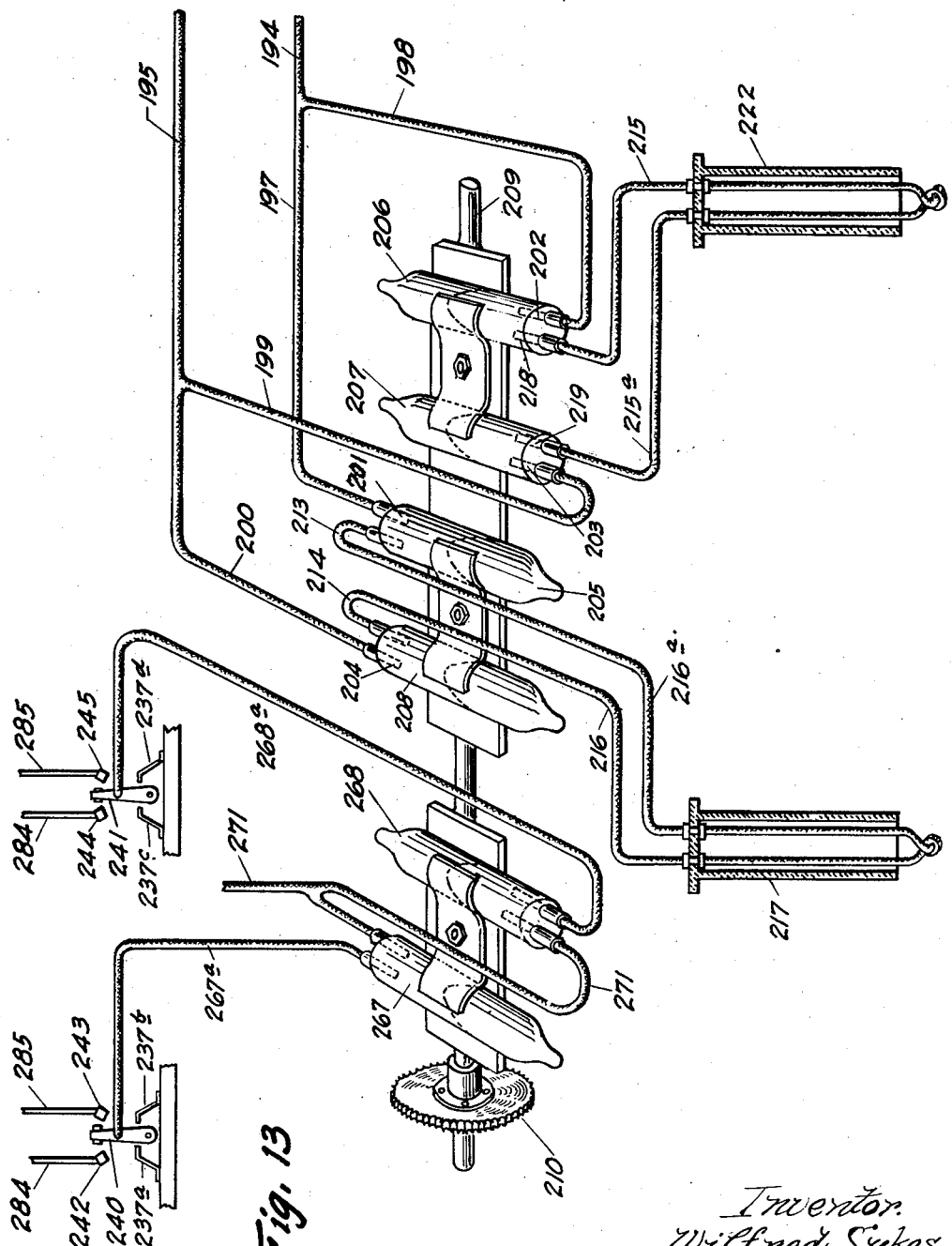
Figure 13 is a view like Fig. 4 of the modified apparatus.

The actuation of the motor 55 rotates the drum 128 in the direction of the arrow in Fig. 3 through the medium of the speed-reducing mechanism 56, with the result of rotating the shaft 52. In the rotation of the shaft throughout 180° the oil valve 37 and steam valve 35 are closed and the oil valve 38 and steam valve 36 are opened, to shut off the flow of steam and oil to the left-hand end of the furnace and establish such flow to the right-hand end of the furnace, when the valves 40 and 42 are open and the valve controlling pipe 59 is closed and to shut off the flow of gas through the pipe 26 to the left-hand end of the furnace where the valve in pipe 59 is open and the valves 40 and 42 are closed, and direct the gas into the right-hand end of the furnace.

Upon completion of the rotation of drum 128, approximately 180°, the plate 129 disengages from the contacts 131 and 132 thereupon breaking the motor circuit and the various valves referred to remain in the positions to which they were operated as above described.

The plate 123, cooperating with the contacts 125 and 126 controls, in alternation with the contact plate 124 cooperating with the contacts 126 and 127, the operations of the reversible motor 77 which in turn controls the stack dampers 18 and 19, the valves 29 and 30 controlling the introduction of air into the regenerative chambers, and the position of the switches by means of which the current is caused to flow to the pyrometer from the thermocouples 222 and 217, always in the same direction, regardless of the direction in which the furnace is being fired. When the plate 123 engages the contacts 125 and 126 the following circuit is established: Through wire 181, contact 126, contact plate 123, contact 125, wire 177, limit switch 178 (closed in this position), and through the controller 176 which so conditions the apparatus that current is supplied through the wires 184, 185, 186 and 187 for operating the motor 77 in a direction to rotate the shaft 66 from the right to the left in Fig. 1ª thereby closing stack valve 19, opening stack valve 18, closing air valve 29 and opening air valve 30 and rotating the shaft 209 from the right to the left in Fig. 1ª, the limit switch 178 opening automatically to interrupt the flow of current to the motor 77 as soon as the parts actuated by this shaft 66 as stated are moved to the positions just referred to.

The operation of the shaft 209 as stated breaks the circuit at the switches 206 and 207 and closes the circuit at the switches 205 and 208, the purpose of the four switches just referred to being to cause the current to flow to the pyrometer always in the same direction regardless of furnace-reversals.

It will be understood from the foregoing that as soon as the contact plate 107 disengages at its portion 108 from the contacts 110 and 111 the circuit through the motor 99 is broken and the drum 103 stops after having rotated substantially 180° in which movement the contact plate 104ª moves into engagement with the contacts 105 and 106 to condition the apparatus for the rotation of the drum 103 through another 180°, when the walking beam 92 is actuated by the pin 91ª to close the circuit at the contacts 95 and 96.

The contact plates 104, 107, 112, 116 and 119 are of the same shape and size as the contact plates 104ª, 107ª, 113, 116ª, and 120, respectively, and are diametrically opposed to each other as represented in Fig. 2. While the plates 123 and 124 are of the same shape and size and located at opposite sides of the drum, they are relatively offset lengthwise of the drum so that the plate 123 cooperates with the contacts 125 and 126 whereas the plate 124 cooperates with the contacts 126 and 127. The plate 123 controls the circuit for driving the motor 77 in the direction above described, and the plate 124 in the next operation of rotating the drum 103 180° controls the circuit comprising the wire 181, contact 126, plate 124, contact 127, wire 179, and limit switch 180 through which the controller 176 is controlled for driving the motor 77 in the reverse direction.

Continuing the description of the operation of the apparatus, assuming the parts thereof to be in the position shown in the drawings, should the regenerative chamber 14 become heated to such a degree, relative to the temperature of the regenerative chamber 13, that voltage of a potential requisite for actuating the pyrometer-switch 142 to closed position is supplied to the pyrometer by the thermocouple 222 (modified by the bucking effect of the current generated in the thermocouple 217) before the pin 91ª rocks the walking beam 92 to a position for closing the circuit at the contacts 95 and 96, the switch 142 will be actuated and thereby effect closing of the relay 153 with the same results as above explained in connection with the closing of the relay 153 by the rocking of the walking beam 92 into engagement with the contacts 95 and 96, it being understood that in the operation of the drum 103 through the control of the relay 153, to a position in which the plate 112 engages the contacts 114 and 115, the disk 89 will return automatically to the position shown in Fig. 2 and as soon as the plate 112 disengages from the contacts 114 and 115 the disk 89 will be operated in a direction to move the pin 91ª into engagement with the walking beam 92.

The mechanism shown is thus adapted to automatically effect repeated reversals of the furnace responsive to the creation of a predetermined temperature differential of the gaseous flow to and from the furnace, or responsive to the lapsing of a predetermined length of time provided such temperature-differential has not been attained before such lapse of time.

The circuit established and by which the pyrometer-switch 142 controls the relay 153 is as follows: Wire 133, wire 135, switch device 137, wire 140, contacts 141 and 143, wire 144, wire 154, winding 152 of relay 153, wire 151, contact 105, plate 104, contact 106, wire 162, and wire 134, it being understood that as soon as the valves of the furnace structure have been reversed under the control of the pyrometer and the potential of the current supplied by the thermocouples to the pyrometer resultantly decreased to a degree insufficient to maintain the pyrometer-switch 142 in closed position, by reason of the reversal of the gaseous flow through the regenerative chambers, the relay 153 will become deenergized.

It will be understood that if desired the apparatus may be caused to reverse wholly upon the time limit basis or wholly upon the basis of the predetermined temperature-differential of the gases flowing through the regenerative chambers. In the former case the thermocouples and their controlling mechanism would be omitted and in the latter case the timing mechanism and its circuit connections would be omitted.

If desired, the master contact drum 103 may be started into operation (with either its plate 104 or 104ª in engagement with the contacts 105 and 106) by the operator shifting the movable contact 136 into engagement with contact 139 and closing switch 145, whereupon motor 99 starts and the single cycle of operations above described in connection with the operation of motor 99 through the timing mechanism, are effected, except that the motor 78 does not operate as current thereto is shut off at switch 137.

The apparatus shown also comprises mechanism for maintaining within the furnace proper a slight positive pressure equivalent, by way of example, to about one or two hundredths of an inch of water for preventing the drawing of air into the furnace through the various openings therein which would interfere with proper combustion, a description of this mechanism being as follows: Located in the stack 17 is a vertically sliding damper 223 connected to one end of a cable 224 extending from pulleys 225 and 226 and wound at its opposite end upon a drum 227 driven from the shaft 228 of a motor 229 through reduction gearing 230. When the motor is rotated in one direction the valve 223 is lifted and when rotated in the opposite direction this valve is lowered to control the stack outlet.

The motor 229 is operated responsive to the pressure existing within the furnace proper 10 the means for this purpose comprising two similar circuit-controlling liquid-seal devices 231 and 232 each comprising a receptacle 233 for liquid as for example water, and containing a pipe 234 opening into a pipe 234ª which communicates with the interior of the flue which connects the flues 15 and 16 to the stack 17, the pipes 234 opening into the receptacles 233 above the levels of the liquid therein. The tops of the receptacles 233 are open to the atmosphere and each contains a bell-shaped member 235 surrounding the pipe 234 and extending at its lower edge into the liquid in the receptacle, the members 235 having upwardly extending stems 236 pivotally connected with levers 237, having counterweights 238 adjustable thereon, and pivoted at 239 to the receptacle 233. By adjusting the counterweights 238 the actuation of the levers 237 may be rendered responsive to greater or less pressure in the furnace, as desired.

The liquid-seal device 231 also comprises a rigid contact arm 240 pivoted at 240ª and the liquid-seal device 232 also comprises a rigid contact arm 241 pivoted at 241ª. The arm 240 is located between, and cooperates with, stationary spaced contacts 242 and 243, and the lever 241 with spaced contacts 244 and 245. The arm 240 is located between, and operable by, spaced push-fingers 237ª and 237ᵇ on the lever 237 of device 231, and the arm 241 is located between, and operable by, spaced push-fingers 237ᶜ and 237ᵈ on the lever 237 of device 232.

The mechanism also comprises two limit switches 246 and 247, having movable contacts 248 and 249, respectively, and stationary contacts 250 and 251, respectively. The movable contacts 249 and 250 are located at opposite sides, and in the path, of a block 252 on the cable 224, these limit switches serving to automatically interrupt the supplying of current to the motor 229 in the movement of the valve 223 to either of its extreme positions, and thus afford means to regulate the maximum and minimum degree of opening of the valve 223.

The mechanism also comprises two switch devices represented at 253 and 254 and in the form of relays, the switch device 253 comprising two fixed contacts 255 and 256 and a contact lever 257 pivotally supported at 258 and adapted to engage one only of the contacts 255 and 256 at one time. A spring 259 tends to hold the lever 257 in engagement with the contact 256. The lever 257 is connected with the core 260 of a solenoid the winding of which is represented at 261 and which operates when energized to disengage the lever 257 from the contact 256 and move it into engagement with the contact 255.

The switch device 254 is of the same construction as the switch device 253, its fixed contacts being represented at 262 and 263, its pivot lever at 264, the spring controlling the lever at 265 and the winding of the solenoid which actuates the lever 264, at 266.

The mechanism also comprises the two alternately effective contact plates 400 and 401 on drum 103.

The circuit connection between the various parts of the mechanism as above described are as follows: The line wires are represented at 269 and 270 and are continuations of the line wires 133 and 134, respectively, the line wire 269 being connected by wires 272 and 273 with the stationary contacts 255 and 262, respectively, the wire 269 being connected with one end of the field winding 274 of the motor 229. The line wire 270 connects with the other end of the field winding 274 and with the wire 275 branched as indicated with its branches connected to the fixed contacts 256 and 263, the wire 270 also connecting with the wire 276 which connects with a wire 277 connecting together the windings 261 and 266. The other end of the winding 266 connects by a wire 278 with the contact 249 of the limit switch 247 and the other end of the winding 261 connects, by a wire 279, with the movable contact 248 of the limit switch 246. The contact lever 258 connects, by a wire 280, with one of the brushes of the motor 229, the other brush being connected, by a wire 281, with the contact lever 264. The contact arm 240 connects, by a wire 282, with the contact 403 and the contact arm 241 connects, by a wire 283, with the contact 404, a wire 402ª connecting contact 402 with the line wire 133. The stationary contacts 242 and 244 connect, by a wire 284, with the stationary contact 251 of the limit switch 247 and the stationary contacts 243 and 245 connect, by a wire 285, with the stationary contact 250 of the limit switch 246.

Assuming the reversing mechanism of the furnace to be in the position shown in the drawings, the control of the pressure in the furnace is effected through the medium of the liquid-seal control device 231, the contact plate 400 engaging the stationary contacts 402 and 403 in this position of the parts, whereas, the plate 401 is out of engagement with the contacts 402, 403 and 404.

The parts of the device 231 and 232 are so constructed and arranged that when the desired positive pressure exists within the furnace chamber the contact arms 240 and 241 will be in the neutral position shown in Fig. 8.

Assuming that the pressure within the furnace drops below that desired, the bell 235 of the device 231 will lower thereby swinging the arm 240 into engagement with the contact 242 which closes the circuit through the switch relay 254, the closing of which latter causes the current to pass to the brushes of the motor 229 in a direction to rotate this motor for lowering the valve 223 and thereby reducing the effective opening of the stack. The circuit which is established through such operation is as follows: Wire 133 (269), stationary contact 402, contact plate 400, stationary contact 403, wire 282, contact arm 240, contact 242, wire 284, limit switch 247, wire 278, winding 266, wire 277, wire 276, and wire 270 (134). The energizing of this circuit causes the contact lever 264 to disengage from the contact 263 and engage the contact 262 whereupon the following circuit is established: Wire 269, wire 273, contact 262, contact arm 264, wire 281, motor 229, wire 280, contact lever 257, contact 256, wire 275, and wire 270, whereupon the motor 229 starts.

The motor 229 continues to operate until the pressure within the furnace rises to such a degree that the contact arm 240 disengages from the contact 242 and assumes neutral position whereupon the circuit in which the winding 266 is interposed, breaks, and the lever 264 returns to a position in which the circuit of motor 229 is broken. Should contact arm 240 not disengage from contact 242 before block 252 engages contact arm 249 of limit switch 247, flow of current to winding 266 will cease as the block 252 will open the circuit at contact 249.

Should the pressure within the furnace rise to a point sufficient to cause the lever 240 to engage with the contact 243 the motor 229 is reversely rotated to raise the valve 223 and thereby increase the effective opening through the stack with resultant reduction of pressure in the furnace chamber. The circuit thus established to produce this result is as follows: Wire 133 (269), stationary contact 402, contact plate 400, stationary contact 403, wire 282, contact arm 240, contact 243, wire 285, limit switch 246, wire 279, winding 261, wire 277, wire 276, and wire 270 and thus wire 134. The energizing of this circuit causes the contact lever 257 to disengage from the contact 256 and engage the contact 255 whereupon the following circuit is established: Wire 269, wire 272, contact 255, contact arm 257, wire 280, motor 229, wire 281, contact lever 264, contact 263, wire 275, and wire 270, whereupon motor 229 starts.

The motor 229 continues to operate until the pressure in the furnace drops to such a degree that the contact arm 240 disengages from contact 243 and assumes neutral position whereupon the circuit in which the winding 261 is interposed, breaks, and the lever 257 returns to a position in which the circuit of the motor 229 is broken. Should contact arm 240 not disengage from contact 243 before block 252 engages contact arm 248 of limit switch 246 flow of current to winding 261 will cease as the block 252 will open the circuit at contact 248.

In the operation of reversing the furnace as hereinbefore explained, to shut off the flow of fuel and air into the left-hand end of the furnace and introduce the air and fuel into the right-hand end thereof, the drum 103 in rotating 180° from the position shown in Fig. 2 moves the contact plate 401 into engagement with the stationary contacts 402 and 404 thereby rendering the liquid-seal device 231 nonfunctioning and conditioning the apparatus for the functioning of the liquid-seal device 232. The circuit connections shown are such that the liquid seal mechanism 232, and its cooperating electrical mechanism, function, in connection with the relay devices 253 and 254, to control the valve 223 as, and for the purpose, explained above in connection with the liquid seal mechanism 231.

The two liquid-seal devices 231 and 232 are provided in order that the same internal pressure may be created and maintained in the furnace regardless of which end is being fired, these devices being individually adjustable to compensate for variations in the resistance, by the regenerative chambers, to the flow of the gases from the furnace through these regenerative chambers, respectively.

It is desirable that the air and the fuel supplied to the furnace be combined in the proper proportions and to this end I provide measuring mechanism a description of which is as follows, this mechanism being designed to measure the flow to the furnace of the air and fuel, whether the latter be coke oven gas or other flowable material.

Referring to Figs. 1ᵇ and 9, the pipe 41 through which the oil is supplied to the valved controlling mechanism, is provided with a Venturi tube 286 into the restricted portion of which a pipe 288 opens, a pipe 287 being connected with the inlet end of the venturi. The pipe 287 opens into the upper end of a mercury pot 289, from which rises a tube 290 in communication therewith, the upper end of this tube communicating with the pipe 288, whereby the mercury rises in the tube 290 responsive to increase of flow through the pipe 41. The gage device thus provided may be provided with any desirable calibrations as for example those which show the fuel used per hour in gallons. A mercury column may thus be used, as the force available for operating on the column may be relatively large due to the high pressure at which the oil is delivered through pipe 41.

The measuring means for the air supplied to the pipe 31 comprise a restriction located at 291 in the pipe 31 and which by way of example may be either a Venturi tube, or an orifice plate, the latter being preferred as the fan 32 operates with a few inches only of pressure and it is desirable to keep the drop across the restriction in the pipe 31 as small as possible. As under these conditions the maximum drop in pressure across the restriction at 291 is comparatively slight, it is desirable that the measuring device comprise multiplying means. To this end I provide a closed tank 292 containing a sealing medium, for example a light oil, indicated at 293, this tank containing a bell-shaped member 294 immersed at its lower edge in the sealing medium. A pipe 295 connects with the pipe 31 between the fan 32 and the orifice plate 291 and opens into the top of the receptacle 292 and a pipe 296 connects with the pipe 31 a slight distance beyond the orifice plate and opens into the bottom of a tube 297 extending upwardly in the tank 292 from the bottom thereof to a point above that at which the sealing medium may rise in the bell 294. The elevation of the bell 294 is dependent upon the differential of pressure in the pipes 295 and 296. Mounted on the tank 294 to extend upwardly therefrom are concentric tubes 298 and 299 spaced apart, the tube 299 containing a hollow piston 300 closed at its top and resting upon a body of mercury 301, the tube 299 below the piston 300 communicating with a pipe 302 which opens into the bottom of a mercury tube 303. The top of the tube 303 communicates with a pipe 304 which opens into the top of the tube 299 between the closed upper end thereof and the piston 300. The bell 294 is connected with the lower end of a rod 305 which extends upwardly through the tube 298 and through the closed upper end of the piston 300 to which it is attached, this rod being connected with a cable 306 shown as supported on pulleys 307 and 308 and equipped with a counterweight 309.

The height of the column of mercury in the tube 303 is thus determined by the differential between the pressures in the pipes 295 and 296, the tube 303 being calibrated in any desirable way as for example to show cubic feet per minute, or to show percentage of excess air in furnace.

Measuring means for determining the flow of coke oven gas to the furnace are also provided, these means, which are of the same construction as those above described as provided for measuring the flow of oil through the pipe 41 or gas through pipe 59, comprising a mineral oil pot 310 into the upper portion of which opens a pipe 311 connected with the pipe 59 in advance of a venturi 312 in the pipe 59 and a pipe 313 which leads from the restricted portion of the venturi 312 into the upper end of a tube 314 connected at its lower end with the mineral oil pot 310, whereby the height of the column of mineral oil in the tube 314 is determined by the differential between the pressures in the pipes 311 and 313. This gage is also calibrated in any desirable way, as for example to show cubic feet of gas per minute.

In Figs. 10 to 14, inclusive, I have disclosed a modification of the apparatus forming the subject of Figs. 1 to 9, inclusive, the modifications consisting primarily in such changes that the thermocouples operate individually, but alternately, to control the reversing mechanism, and the liquid-seal devices are alternately conditioned for functioning by switches actuated by the shaft 209 instead of by electrical contacts controlled by the drum 103.

In these figures the designating numerals applied to the preceding figures have been used on Figs. 10–14, inclusive, to designate the same parts, the additional or substitute parts being given new designating numerals.

The thermocouples 217 and 222 are shown in these figures as extending into the flues 15 and 16, respectively, and are connected with the switches 205, 206, 207 and 208 as follows: One terminal of thermocouple 217 connects with terminal 214 by wire 216, the other terminal of this thermocouple connecting with the contact 213 by a wire 216ª. One terminal of thermocouple 222 connects by a wire 215 with contact 218, the other terminal of this thermocouple being connected with the contact 219 by a wire 215ª.

Thus when the furnace is being fired from its left-hand end and the switches 206 and 207 are in circuit-closing position the thermocouple 222 on the flue 16 functions and the thermocouple 217 is non-functioning; and when furnace-reversal occurs and the shaft 209 rocks, it opens switches 206 and 207 and closes switches 205 and 208 and the thermocouple 222 becomes non-functioning and the thermocouple 217 functions.

The switches for alternately bringing the liquid-seal device 231 and 232 into service are shown as tiltable mercury switches reversely mounted on the shaft 209 and represented at 267 and 268. A wire 271 connects one terminal of each switch 267 and 268 with the line wire 270, the other terminals of these switches, respectively, connecting by wires 267ª and 268ª with the movable contacts 240 and 241, respectively. When the furnace is being fired from the left-hand end the liquid-seal device 231 functions and when the furnace is reversed the liquid-seal device 232 functions; but if desired, the functioning of the liquid seals may be reversed as compared with the functioning above stated.

While I have illustrated and described certain embodiments of my invention, I do not wish to be understood as intending to limit it thereto as the same may be variously modified and the invention embodied in other forms without departing from the spirit thereof.

What I claim as new, and desire to secure by Letters Patent, is:

1. In a regenerative furnace, the combination with its furnace proper and regenerative chambers communicating therewith, of means operating automatically upon the lapsing of a predetermined time interval to reverse the flow through said regenerative chambers comprising mechanism including a movable element controlling the reversal, means for driving said element in one direction and comprising a clutch, means for driving said element in the opposite direction, and means operative upon the driving of said element by said second-named means, to a predetermined position in which the flow is reversed, to release said clutch and permit said third-named means to return to initial position and thereupon restore said clutch to clutching position.

2. In a regenerative furnace, the combination with its furnace proper and regenerative chambers communicating therewith, of means operating automatically upon the lapsing of a predetermined time interval to reverse the flow through said regenerative chambers comprising mechanism including a movable element controlling the reversal, a continuously operating device, clutch means for connecting said device with said element for driving said element in one direction, means for driving said element in the opposite direction, and means operative upon the driving of said element by said device, to a predetermined position in which the flow is reversed, to release said clutch and permit said second-named means to return to initial position; and thereupon restore said clutch to clutching position.

3. In a regenerative furnace, the combination with its furnace proper and regenerative chambers communicating therewith, of means operating automatically upon the lapsing of a predetermined time interval to reverse the flow through said regenerative chambers comprising mechanism including a walking-beam element controlling the reversal, a movable element controlling the position of said walking-beam element, means for driving said movable element in one direction, means operative upon the movement of said movable element to a predetermined position in which said walking beam element is actuated and such reversal effected, to effect discontinuance of the drive of said movable element, and means for returning said movable element to initial position.

4. In a regenerative furnace, the combination with its furnace proper and regenerative chambers communicating therewith, of means operating automatically to reverse the flow through said regenerative chambers, said means including an element initiating the operation upon the lapsing of a predetermined time interval and an element responsive to temperature conditions in the furnace serving to initiate the operation provided such temperature conditions are reached before such lapsing of time.

5. In a regenerative furnace, the combination with its furnace proper and regenerative chambers communicating therewith, of means operating automatically to reverse the flow through said regenerative chambers, said means including an element initiating the operation upon the lapsing of a predetermined time interval and an element responsive to attainment of a predetermined differential between the temperatures in said regenerative chambers serving to initiate the operation, whichever is the first to transpire.

6. In a regenerative furnace, the combination with its furnace proper and regenerative chambers communicating therewith, of means operating automatically to reverse the flow through said regenerative chambers, and means for controlling the pressure within the furnace comprising a plurality of mechanisms alternately operative in the flow in opposite directions, respectively, through said regenerative chambers and controlled, to be alternately operative, by said first-named means.

7. In a regenerative furnace, the combination with its furnace proper and regenerative chambers communicating therewith, of means operating automatically to reverse the flow through said regenerative chambers, and means for controlling the pressure within the furnace comprising a plurality of pressure-responsive mechanism in communication with the furnace and alternately operative by the flow in opposite directions, respectively, through said regenerative chambers and controlled, to be alternately operative, by said first-named means, and mechanism, including a valve in the furnace, controlled by said pressure-responsive mechanisms.

WILFRED SYKES.